March 12, 1968   H. R. FISCHER   3,372,479
CUTTING JAW HEAD UNIT FOR A NIPPING TOOL
Filed April 29, 1966   2 Sheets-Sheet 1

INVENTOR.
HOWARD R. FISCHER
BY
Stephen J. Rudy
ATTORNEY

March 12, 1968  H. R. FISCHER  3,372,479
CUTTING JAW HEAD UNIT FOR A NIPPING TOOL
Filed April 29, 1966  2 Sheets-Sheet 2
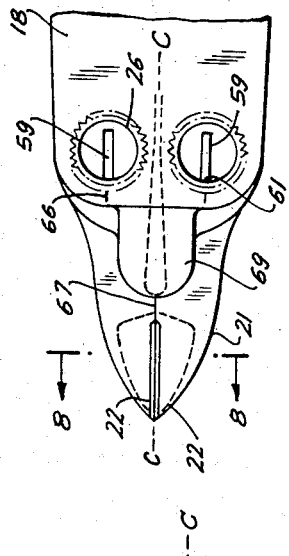
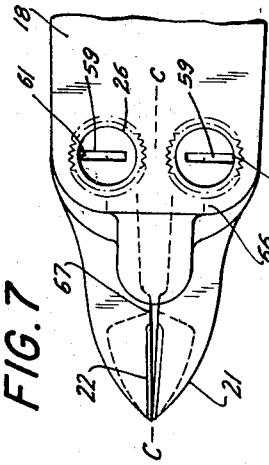
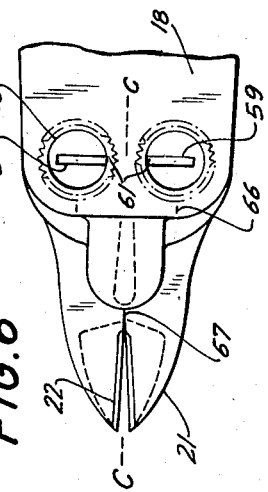
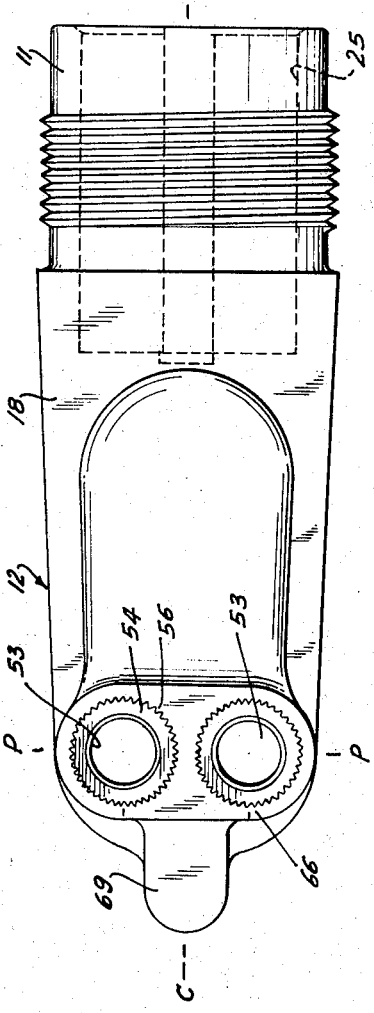
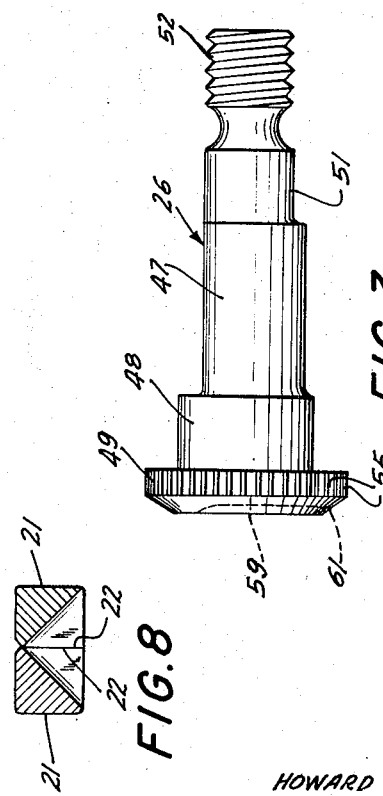
INVENTOR.
HOWARD R. FISCHER
BY
Stephen J. Rudy
ATTORNEY

United States Patent Office 3,372,479
Patented Mar. 12, 1968

3,372,479
CUTTING JAW HEAD UNIT FOR A NIPPING TOOL
Howard R. Fischer, New Hartford, N.Y., assignor to Chicago Pneumatic Tool Company, New York, N.Y., a corporation of New Jersey
Filed Apr. 29, 1966, Ser. No. 546,306
7 Claims. (Cl. 30—180)

The subject of the invention is an improved cutting jaw head unit which is mountable to the open end of a piston cylinder or housing to provide a nipping tool. The tool is used particularly for cutting wires and trimming flashing from moulded articles. A pair of cutting levers is arranged in the unit in substantially opposed parallel relation, each pivotally bearing upon a separate pivot pin and having a cutting jaw at its forward end. A pneumatically reciprocable piston in the cylinder has a wedged portion which is cooperable with opposed cam surfaces at the tail ends of the levers to pivot the levers against the resistance of a return spring to carry the cutting jaws to closed condition. The return spring functions automatically upon retraction of the piston to re-open the jaws. Each pivot pin is subject to selective fine angular adjustments, whereby the angle at which the levers pivot and the jaws close may be varied to suit the needs of the work. Each pivot pin is also readily removable from the unit to enable removal of the related lever for replacement or other purpose. The particular nature of the jaw head unit also provides other benefits, as indicated further herein.

A nipping tool in which the jaw head unit of the present invention is incorporated is designed to meet the needs, particularly of the electronic and plastic industries wherein innumerable workers spend their time cutting wires and trimming flashing from moulded plastic articles. It is desired in these operations that the cut be sharp, a result not always obtainable with known nipping tools. In the latter, the jaws have a non-variable pivoted relation to each other causing them to close in only one manner whereby cutting is effected largely near the heel area of the jaws. A further deficiency of known nipping tools is that in a cutting operation the cutting edges of the jaws invariably strike each other upon closing, thus dulling the jaws and reducing the cutting life of the tool. The fixed pivoted relation of the jaws of known nipping tools is a fault which makes re-sharpening of the cutting edges difficult. In some operations, as in the case of small soft wires, it is desired that cutting occur at the tip of the cutting edges; in other operations, as in the case of heavy wires, it is desired that cutting occur at the heel of the cutting edges; and in other operations, as in the case of plastic flashing, it is often desired that the cutting edges close in parallel relation upon the work. Known tools do not have the capacity for these several operations because of the fixed pivoted relation of the jaws.

The jaws of the tool of the present invention do not have a fixed pivoted relation but are selectively adjustable in their manner of pivoting so that cutting can be effected as desired: at the tip of the cutting edges; in the heel area; or by parallel meeting of the cutting edges along the full length thereof. Further, the jaws are individually removable for purposes of re-sharpening or replacement; and stop means is provided on the jaws to avoid forceful meeting and consequent dulling of the cutting edges in certain cutting operations. Further, each cutting jaw is a part of an elongated lever which has a bearing relation upon an individual pivot to the full extent of the width of the lever, and is so arranged in a jaw head unit as to pivot at all times without undesirable side play.

In the accompanying drawings:

FIG. 3 is a detail of a pivot pin;

FIG. 4 is a detail in side elevation of the forked member of the jaw head unit;

FIG. 5 is a fragmentary detail of the front end of the jaw head unit showing the cutting edges of the levers meeting in parallel relation in closed condition as a result of a selected adjustment of the pivot pins;

FIG. 6 is a detail similar to FIG. 5, but showing the tips of the cutting jaws spaced angularly apart when closed as a result of a further adjustment of the pivot pins;

FIG. 7 shows the jaws as having a closed condition opposite to that shown in FIG. 6 as a result of a further adjustment of the pivot pins; and FIG. 8 is a section on line 8—8 of FIG. 5.

Figure 2:
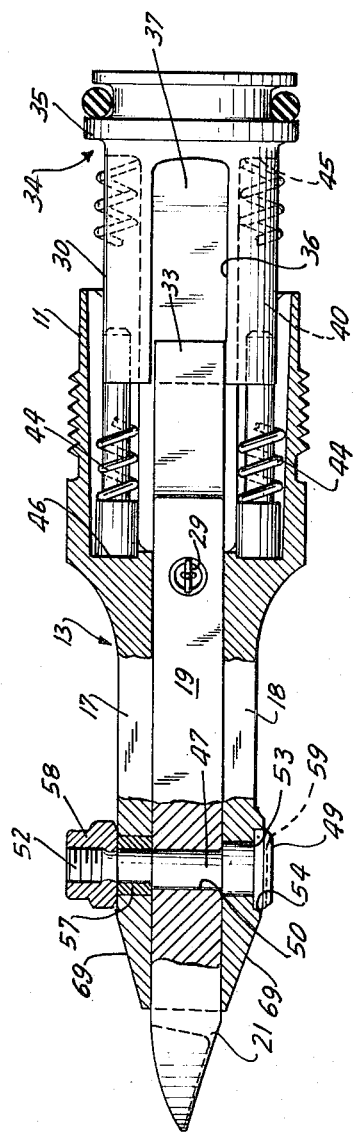
FIG. 2 is a top plan view of the jaw head unit of FIG. 1 apart from the piston cylinder, and showing some portions in section.

The tool illustrated in the drawing includes a housing or piston cylinder 9 of general cylindrical contour, serving as a handle adapted to be held in the palm of the hand. The housing has an axial recess defining a piston chamber 10 into the open end of which the tailpiece 11 of an adapter or forked member 12 of a jaw head unit 13 (FIG. 2) is removably fitted. The tailpiece extends partway into the piston chamber, and is removably retained therein by means of a threaded connection, as at 14. A retaining screw 15 engageable in a hole 16 of the tailpiece serves to lock the position of unit 13.

A pair of axially extending parallel arms 17 and 18 defining the fork of the forked member 12 is bridged at their rear by the tailpiece 11. Pivotally supported in the fork in substantially parallel opposed relation to each other is a pair of cutting levers 19. Each lever terminates at its forward end in a jaw 21, here having a straight cutting edge 22; and each lever terminates at its rear in a tail finger 23 having along its inner side an outside radius or cam surface 24. The tail fingers extend through an opening at the rear of the fork into an open ended bore 25 formed in the rear of the tailpiece. Each lever is supported a short distance from its jaw end upon a separate pivot pin 26 for pivotal movement to carry its jaw in a cutting operation toward and away from the jaw of the other lever. A spring 27 anchored between the levers biases them about their pivots so as to draw the tail fingers toward each other and open the jaws. Each end of the spring extends into a separate hole 28 of each lever, and is anchored in the hole upon a transverse pin 29. The normal axes of the pivot pins 26 are centered on a line P—P perpendicular to the longitudinal axis or center line C—C of the tool, and are equidistant from the center line. Each lever has a crest 31 centered on this perpendicular line, from which crest the inner surfaces 32 and 33 of each of the levers recede in opposite directions. The longer surfaces 33 merge into the cam surfaces 24 of the tail fingers. This structure allows for a desirable limited pivoting of the levers relative to one another.

Figure 1:
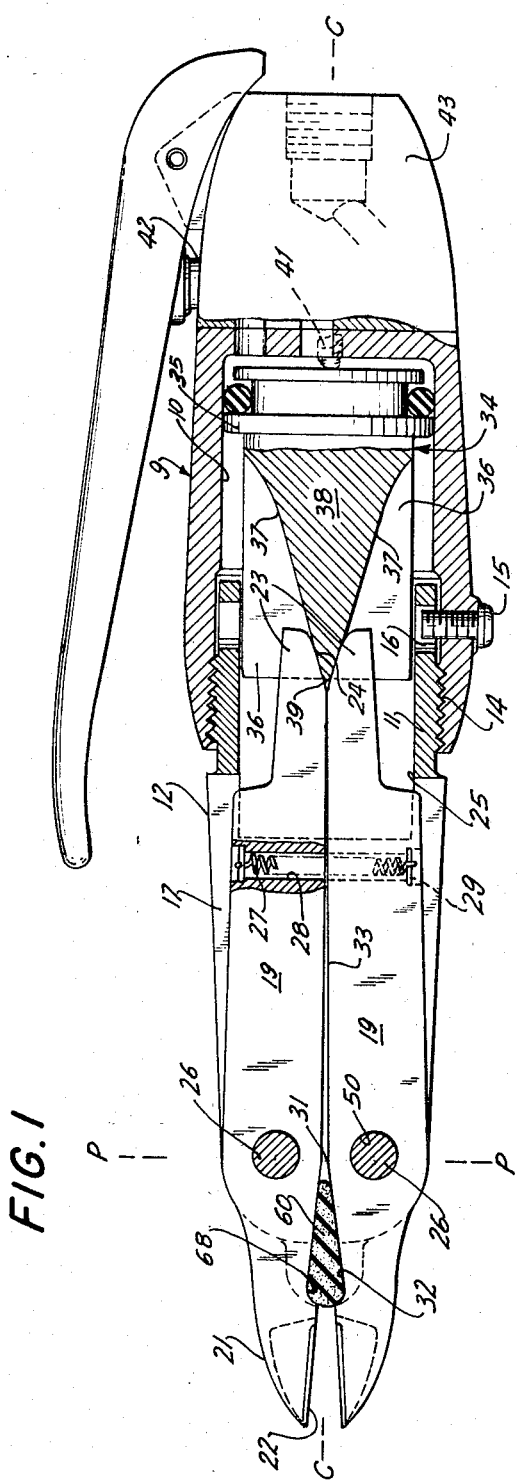
FIG. 1 is a longitudinal section of a nipping tool embodying the invention, showing the piston fully retracted and the cutting jaws fully open.

Piston means is provided to swing the tail fingers of the levers apart so as to carry the jaws into cutting relation. This means includes a wedge piston 34. The latter has a head 35 reciprocable in the piston chamber 10 rearwardly of the tailpiece of the jaw head unit. An axial extension 30 of the piston extends into and has slidable movement in the bore 25 of the tailpiece 11 relative to the tail fingers 23 as the piston reciprocates. The extension has a pair of opposed longitudinally extending radial slots 36, each of which is bottomed by a cam slide surface 37. The slide surfaces define opposite faces of a wedge 38, the nose of which is defined by a small outside radius 39 tangent to the low ends of the slide surfaces. In the retracted position of the piston, as in FIG. 1, the tail fingers of the levers extend partway into the slots 36 of the piston; and the nose end 39 of the wedge 38 is positioned in a triangular head unit are extended as at 69 to cover over opposite ends of the space 68. A piece of sponge rubber 60 (FIG. 1) is placed in space 68 to prevent flying particles entering over the stop area 67.

A further advantage of the structure and mode of assembly of the cutting levers in the tool is that each lever may be individually removed for resharpening or replacement.

While each jaw 21 has been disclosed as having a cutting edge 22, the jaws may be modified so that instead of a cutting edge, one of the jaws will have a flat anvil face. In this case, cutting will be performed by one lever cooperating with the anvil face.

What is claimed is:

1. A cutting jaw head unit for a nipping tool, comprising a forked member, a pair of cutting levers arranged in the fork in substantially parallel relation to the longitudinal axis of the fork, each lever having a cutting jaw at one end in opposed relation to a cutting jaw of the other and having at its opposite end a tail finger provided with a cam surface in opposed relation to a cam surface of the other tail finger, a separate pin pivotally supporting each lever near its jaw end in the fork, spring means between the levers biasing the tail fingers toward one another so as to urge the jaw ends of the levers apart, each pin having an eccentric surface upon which the related lever bears as it pivots, each pin being angularly adjustable independently of the other so as to adjust the angle at which the lever is pivotable about the eccentric surface relative to the other lever, and reciprocable camming means cooperable with the opposed cam surfaces to pivot the levers about the eccentric surfaces.

2. A cutting jaw head unit for a nipping tool according to claim 1, wherein each jaw has a straight cutting edge and a flat surfaced stop coextensive with and rearwardly adjacent the cutting edge.

3. A cutting jaw head unit for a nipping tool according to claim 1, including separate means for releasably locking each pin in its adjusted position, wherein each pin is provided with guide means indicating the high point of the eccentric surface, the guide means being a transverse slot in an end of the pin having an open end indicating the location of the high point of the eccentric surface relative to the normal axis of the pin.

4. A cutting jaw head unit for a nipping tool according to claim 1, wherein the cam surfaces of the tail fingers diverge from one another to define a triangular space between the ends of the tail fingers, and the reciprocable means is a piston having a wedge extension adapted to enter between the tail fingers to cam the levers in opposite directions about the pivot pins against the resistance of the spring means.

5. A cutting jaw head unit for a nipping tool according to claim 4, wherein a tailpiece bridging the rear ends of the arms of the fork has an open ended interior into which the tail fingers extend, and in which interior the wedge extension of the piston is reciprocable between the cam surfaces of the tail fingers.

6. A cutting jaw head unit for a nipping tool according to claim 5, wherein the fork is defined by a pair of parallel arms upon the inner faces of which the cutting levers bear without sideplay as they pivot, and the wedge extension has an opposed pair of faces defining the bottoms of a pair of slots in which slots the tail fingers extend.

7. A cutting jaw head unit for a nipping tool according to claim 1, wherein blocking means is provided adjacent the jaws for guarding against the entry of clippings between the levers rearwardly of the jaws.

References Cited
UNITED STATES PATENTS

| Re. 25,842 | 8/1965 | Keane et al. | 30—180 |
| 562,260 | 6/1896 | Toguet | 30—193 |
| 751,202 | 2/1904 | Porter | 30—193 |
| 770,270 | 9/1904 | Dehn | 30—180 |
| 1,733,374 | 10/1929 | Kalgren | 30—180 |
| 2,529,949 | 11/1950 | Jones et al. | 30—186 |
| 3,177,583 | 4/1965 | Fischer et al. | 30—180 |

OTHELL M. SIMPSON, *Primary Examiner.*

WILLIAM FELDMAN, *Examiner.*

J. C. PETERS, *Assistant Examiner.*